(12) United States Patent
Hauck

(10) Patent No.: US 10,906,326 B2
(45) Date of Patent: Feb. 2, 2021

(54) METHOD FOR GENERATING SUBSTRATE-DEPENDENT COMPENSATION PROFILES AND FOR COMPENSATING FOR POSITION-DEPENDENT DENSITY FLUCTUATIONS

(71) Applicant: HEIDELBERGER DRUCKMASCHINEN AG, Heidelberg (DE)

(72) Inventor: Axel Hauck, Karlsruhe (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 16/697,584

(22) Filed: Nov. 27, 2019

(65) Prior Publication Data

US 2020/0164660 A1    May 28, 2020

(30) Foreign Application Priority Data

Nov. 27, 2018  (DE) .................. 10 2018 220 334

(51) Int. Cl.
| | | |
|---|---|---|
| *B41J 2/21* | (2006.01) | |
| *B41J 2/205* | (2006.01) | |
| *B41J 29/393* | (2006.01) | |
| *H04N 1/60* | (2006.01) | |
| *H04N 1/407* | (2006.01) | |

(52) U.S. Cl.
CPC .......... *B41J 2/2132* (2013.01); *B41J 2/2054* (2013.01); *B41J 29/393* (2013.01); *H04N 1/4078* (2013.01); *H04N 1/6027* (2013.01); *H04N 1/6097* (2013.01); *B41J 2029/3935* (2013.01)

(58) Field of Classification Search
CPC ...... B41J 2/2132; B41J 29/393; B41J 2/2054; B41J 2029/3935; H04N 1/6097; H04N 1/4078; H04N 1/407; H04N 1/6027
See application file for complete search history.

(56) References Cited

U.S. PATENT DOCUMENTS

| | | | |
|---|---|---|---|
| 6,886,902 B2 | 5/2005 | Scardovi | |
| 9,375,964 B2 | 8/2016 | Koehler et al. | |
| 2007/0024647 A1 | 2/2007 | Cowan et al. | |
| 2012/0287194 A1 | 11/2012 | Masuda et al. | |

FOREIGN PATENT DOCUMENTS

| | | |
|---|---|---|
| DE | 60102823 T2 | 4/2005 |
| DE | 102015220716 A1 | 5/2016 |

*Primary Examiner* — Julian D Huffman
(74) *Attorney, Agent, or Firm* — Laurence A. Greenberg; Werner H. Stemer; Ralph E. Locher

(57) ABSTRACT

A method for compensating for position-dependent density fluctuations of print nozzles in any inkjet printer by a computer. The computer produces, for all substrates used, compensation profiles for the position-dependent density fluctuations over all print heads of the inkjet printer and applies the compensation profiles to compensate for the position-dependent density fluctuations in the inkjet printer. The computer determines in each case printer-specific or print head-specific influences and print substrate-specific influence factors with a generic reference print substrate, from which a reference compensation profile is produced which depends on the surface coverage and location. From this the computer produces a total compensation profile which is used to compensate for position-dependent density fluctuations.

8 Claims, 2 Drawing Sheets

METHOD FOR GENERATING SUBSTRATE-DEPENDENT COMPENSATION PROFILES AND FOR COMPENSATING FOR POSITION-DEPENDENT DENSITY FLUCTUATIONS

CROSS-REFERENCE TO RELATED APPLICATION

This application claims the priority, under 35 U.S.C. § 119, of German Patent Application DE 10 2018 220 334.2, filed Nov. 27, 2018; the prior application is herewith incorporated by reference in its entirety.

BACKGROUND OF THE INVENTION

Field of the Invention

The invention lies in the technical field of inkjet printing. More specifically, the invention concerns a method for compensating for position-dependent density fluctuations of print nozzles in an inkjet printer by printer- and substrate-specific compensation.

Inkjet printers use print heads which have rows of print nozzles arranged in widely varying fashions in the print head. Ink is ejected via the print nozzles and thus produces the desired printed image. The print nozzles however, due to manufacture, have slight differences with regard to the ejection behavior of the ink. This means that when two print nozzles are actuated precisely identically and should therefore generate precisely the same size of ink droplets, these nonetheless differ slightly because of the manufacturing-related differences. This results in slight fluctuations in the achieved pixel sizes and pixel color values in the finished printed image. These are known as density fluctuations. The density fluctuations may be amplified by further effects, such as e.g. faults in the ink supply lines. The printed image to be produced by the inkjet printer is negatively influenced by these density fluctuations. To compensate for this, so-called compensation profiles are produced which, for all print heads, correct the actuation of the individual print nozzles depending on the measured and known density fluctuations for the ink ejection from the print nozzles. If, taking the example of nozzle number ten, it is known that this always has a slightly higher ink ejection rate, then the compensation profile always ensures that slightly less ink is ejected at the location for nozzle number ten in order to compensate for this effect. To produce the compensation profiles, density profiles for all print heads transversely to the print direction are produced by means of test printing and measurement or analysis of the test prints. These density profiles indicate precisely which printer nozzles have which density fluctuations. From these profiles therefore, the corresponding compensation profile can be calculated. This is usually done specifically for different print substrates used, since the density fluctuations are also dependent on the corresponding print substrate used. Furthermore, it is known from the prior art not to use a separate compensation profile for every single different print substrate, but to apply a compensation profile for different substrate types in order to reduce the administrative cost with regard to use of compensation profiles. Normally, an average profile is calculated from several compensation profiles for specific substrates, and this is then used for the corresponding substrate. It is also known from the prior art to group together substrates of similar behavior, and then calculate and apply an average profile from the compensation profiles assigned thereto and grouped accordingly.

The compensation profiles may be calculated at the actual location of use of the inkjet printer in the printing shop. It is however also common for the manufacturer of the print heads to supply corresponding compensation profiles on delivery of the print heads. The manufacturer of the inkjet printer—where not identical to the manufacturer of the print heads—may also produce their own compensation profiles and supply these to the print shop.

In the actual process of density compensation, a distinction is also made between compensation before and after the scanning of the image. In the case of compensation before scanning, for known density fluctuations, either the grey values of the image itself are adapted according to the measured density fluctuations, or the scanning process which converts the grey values into corresponding pixel patterns takes account of the density fluctuations accordingly. In the case of compensation after scanning, known as online compensation, during printing the corresponding pixels or ink droplet sizes are adapted to the density fluctuations occurring which must be measured. Usually, the greatest density fluctuations—which are already known for a print head via the compensation or density profile supplied by the manufacturer or were determined by preparatory measures—are corrected accordingly in pre-compensation, while changes in density fluctuations during the printing process can be corrected using online compensation.

Recording a density profile and calculating a compensation profile is very time-consuming and also creates spoilage. The costs can be reduced by accelerating and automating the process. The use of different print substrates multiplies the calculation complexity many times, since the process of calculating a compensation profile must practically be performed completely again for every new print substrate. On changes of the influential peripheral conditions, such as the jetting behavior of the print heads or the inks, these calculations must also be repeated completely. On failure and/or replacement of a single print head, the compensation profiles must also be recalculated for all print substrates.

The—as yet unpublished—German patent application DE 10 2018 216 434 therefore discloses a method for compensating for position-dependent density fluctuations of print nozzles in an inkjet printer by a computer, wherein for all print substrates used, the computer produces compensation profiles for the position-dependent density fluctuations over all print heads, calculates an average profile from these and applies this average profile to compensate for position-dependent density fluctuations in the inkjet printer; this method is characterized in that, on exchange of one or more print heads of the inkjet printer, the computer calculates a new compensation profile only for one print substrate, then from this the computer derives a new average profile, and the computer calculates and applies the new average profile using the old compensation profiles for the remaining print substrates. Here however, no explicit reference is made to the dependency of the density profile on the surface coverage, which must at least be reflected in the scalar factors. The reference and reference value of this method is also the mean curve which is calculated from the individual compensation profiles determined for the individual print substrates. This however also requires the mean values of the individual profiles to be the same, otherwise conversion via one scalar factor is erroneous.

BRIEF SUMMARY OF THE INVENTION

It is accordingly an object of the invention to provide a method for generating specific compensation profiles, which overcomes the above-mentioned and other disadvantages of the heretofore-known devices and methods of this general type and which provides for an alternative method for substrate-dependent density compensation in the inkjet, which reduces the complexity of the density compensation further while retaining at least the same compensation quality.

With the above and other objects in view there is provided, in accordance with the invention, a method of compensating for position-dependent density fluctuations of print nozzles in print heads of an inkjet printer by a computer. The novel method comprises:

for all substrates used, using the computer to produce compensation profiles for the position-dependent density fluctuations over all print heads of the inkjet printer;

determining with the computer in each case printer-specific or print head-specific influences and print substrate-specific influence factors with a generic reference print substrate and producing therefrom a reference compensation profile that is dependent on a surface coverage and location;

producing a total compensation profile to compensate for position-dependent density fluctuations and, during printing, applying the compensation profile to compensate for the position-dependent density fluctuations in the inkjet printer.

In other words, the objects of the invention are achieved by a method for compensating for position-dependent density fluctuations of print nozzles in an inkjet printer by a computer, wherein for all substrates used, the computer produces compensation profiles for the position-dependent density fluctuations over all print heads and applies the compensation profiles to compensate for position-dependent density fluctuations in the inkjet printer, wherein the computer determines in each case printer- or print head-specific influences and print substrate-specific influence factors with a generic reference print substrate, from which a reference compensation profile is produced which is dependent on surface coverage and location, and from this produces a total compensation profile which is used to compensate for position-dependent density fluctuations. The core of the invention is thus that, in calculation of a total compensation profile which is then used for different print substrates, the printer- or print head-specific influences and the print substrate-specific influence factors are determined separately from each other and applied separately for influencing the calculations of the total compensation profile. The printer- or print head-specific influences are here taken into account accordingly by recording the density profiles. This leads to a significant reduction in the complexity of the density compensation method, since above all on changes in the respective influence factors, these changes usually occur separately from each other and accordingly can be corrected separately from each other. This is substantially less complex, since on changes of an influence factor, not all influence factors taken into account in the calculation need be redetermined. For the printer- or print head-specific influences, also the type of print substrate used is secondary. Therefore a generic reference substrate is used here. The resulting compensation profile is location-dependent since the compensation profile indicates, for each print nozzle, how this must be actuated in order to compensate for the corresponding density fluctuations. The compensation profile extends over the entire print head or over all print heads used, which is reflected in the location dependency. The surface coverage dependency results from the fact that the density fluctuations are dependent on the surface coverage to be achieved in the printed image to be produced.

In a further preferred refinement of the method according to the invention, the computer determines the print substrate-specific influence factors in that specific compensation profiles are produced for the print substrates used, which the computer then compares with the reference compensation profile, wherein the print substrate-specific influence factors are purely dependent on surface coverage. The print substrate-specific influence factors are thus determined in that corresponding compensation profiles are produced for different print substrates, i.e. a density profile is measured for a specific print substrate, and from this density profile then the compensation profile necessary for this is calculated in turn. The comparison with the reference compensation profile then gives the print substrate-specific influence factors. Since these are not dependent on the printer or print head parameters, logically they have no location dependency. A surface coverage dependency however persists since the resulting printed color value is dependent on the combination of a specific print substrate with a specific surface coverage.

In a further preferred refinement of the method according to the invention, the computer calculates the print substrate-specific influence factors as mean values, median values or other statistical characteristic values, from the ratio of the compensation intensities and the specific print substrate to the reference substrate over the entire print width. This statistical treatment further improves the reliability of the print substrate-specific influence factors calculated in this way.

In a further preferred refinement of the method according to the invention, on adaptation of the total compensation profile to modified printer or print head parameters, the computer redetermines only the printer- or print head-specific influences. One of the great advantages of the method according to the invention is that if the inkjet printer or print head parameters change, only the corresponding influences must be redetermined. This massively reduces the complexity in the production and application of the total compensation profile. The changes may for example be a modified ink ejection behavior of the print nozzles during the print process, or in the extreme case, replacement of a print head.

In a further preferred refinement of the method according to the invention, the computer stores the printer- or print head-specific influences in a database and uses them in the inkjet printer for further print tasks. This is suitable in order firstly to be able to use the resulting knowledge with regard to printer- or print head-specific influences for subsequent print tasks, so that the corresponding total compensation profile need not be recalculated afresh each time for the next print task. Secondly, storage or collection of the printer- or print head-specific influences by means of the database gives a greater data platform. The more corresponding printer- or print head-specific influences are calculated in this way, the more precise they become and the better the applied total compensation profile and hence the density compensation.

In a further preferred refinement of the method according to the invention, the computer takes into account separately the printer- or print head-specific influences for transitional regions between individual print heads of a printing ink. The transitional regions between the individual print heads, known as stitching regions, behave differently from the normal print head regions, since here deviations—in particular in phase position—of individual print nozzles provoke specific fault patterns because of the changing printing of the print nozzles of adjacent print heads in the stitching region. This is because of the special requirements and circumstances which are necessary to ensure that the transition between individual print heads as far as possible has no effect on the printing result. Therefore separate treatment is suitable.

In a further preferred refinement of the method according to the invention, the specific compensation profiles are recorded repeatedly for the print substrates used, the results are stored in the database, and the computer statistically evaluates the results. In addition to storing the printer- or print head-specific influences in a database, the specific compensation profiles for the print substrates used may be stored in the database in order to achieve greater accuracy in the results. It is suitable to record these several times and then statistically evaluate the results stored in the database.

In a further preferred refinement of the method according to the invention, as a generic reference print substrate, a print substrate with average properties is used or a print substrate representative of a substrate class. Which process is preferred, i.e. evaluation of the print substrate with average or mean behavior, or a print substrate representative of a substrate class (where used), depends on the circumstances of the print tasks to be performed.

Other features which are considered as characteristic for the invention are set forth in the appended claims.

Although the invention is illustrated and described herein as embodied in Substrate-Dependent Compensation Profile, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
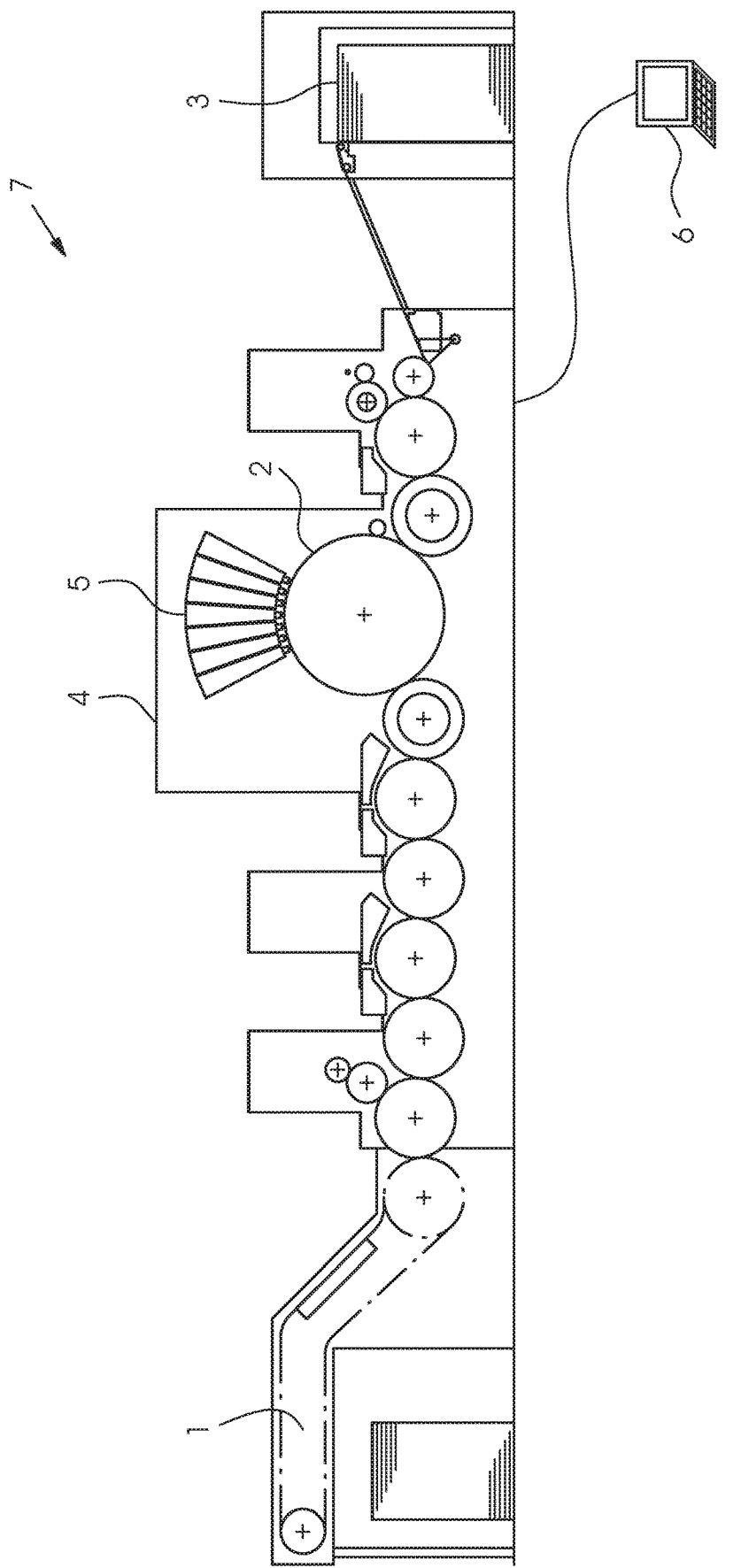
FIG. 1 is a schematic side view of an example of the structure of an inkjet printer system.

The area of application of the preferred embodiment variant is an inkjet printer 7. An example of the basic structure of such printer 7, consisting of a feeder 1 for the supply of the print substrate 2 to the print machine 4 where it is printed by the print heads 5, to the delivery unit 3, is shown in FIG. 1. This is a sheet-fed inkjet printer 7 which is controlled by a control computer 6. On operation of this printer 7, as already described, fluctuations may occur in the resulting surface density of the individual print nozzles. The compensation according to the invention for the local density fluctuations occurring in the inkjet printer 7 takes place by the application of compensation profiles, which ensure compensation for density fluctuations by changing the number or size of the printing dots to be applied on the printing material 2 or print substrate 2.

The factors influencing the resulting density distribution transversely to the printing direction, for a sheet-fed inkjet printer 7 with water-based inkjet inks, can be divided roughly into three groups:

A. Head-specific, printer-specific influences, such as:
  the jetting behavior of the individual print nozzles, phase position/deviation, and amplitude/printing intensity for small, medium and large ink droplets
  the head geometry and structure of the print heads 5 used, e.g. with regard to placing and spacing of the print nozzles in the print head 5
  ageing, wear of the print heads 5, identifiable via the standard deviation of the phase position of the print nozzles
  influences from ink supply, e.g. manifold to the print heads 5, and inside the print heads 5
  piezo-firing voltage for the individual print heads 5, for homogenization of the mean densities
  jetting distance between the print nozzles and the print substrate 2.

B. Substrate-specific influences such as:
  spreading behavior of the ink on the print substrate 2 for small, medium and large ink droplets
  requirement for precoating the print substrate surface to achieve a clean print etc.
  ink absorption, penetration in the print substrate surface for coated and uncoated types.

C. Other possible influences, such as:
  homogeneity of the precoat distribution (quantity) across the format
  Brix degree of the precoat
  raster (screen) and composition of the surfaces (Drop Mixture Table) for the different half-tone values
  droplet volume and resulting dot sizes for small, medium and large ink droplets.

Depending on these, the method according to the invention proceeds as follows in its preferred embodiment. The head-specific and printer-specific influences are identical for printing on all print substrates 2 used, and are determined by the computer 6 on a generic reference print substrate. This may e.g. be photo paper which requires no precoat application, or another reference substrate with precoat application. The resulting compensation profile 10 is generally, via the jetting behavior, dependent on the location of compensation 8 and on the printed surface coverage 13. Consequently, it must be determined for a sufficient number of half-tone values over the entire possible print width 9.

Figure 2:
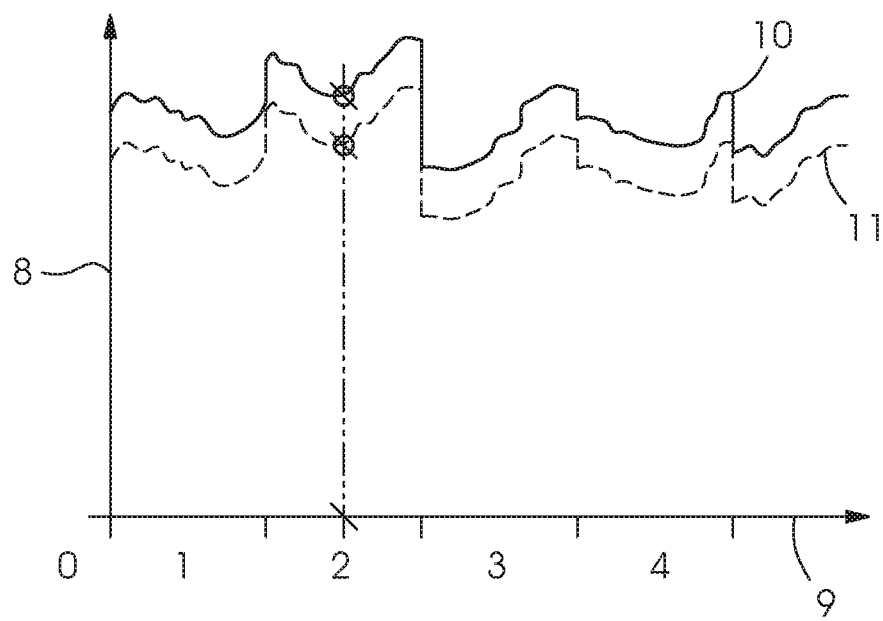
FIG. 2 is a diagram for compensation profiles of a substrate in comparison with the reference substrate.

Starting from this situation, in the same way the computer 6 determines the compensation profiles 10 for different substrates A, B, C, 14, 15, 16. FIG. 2 shows one example of such a compensation profile 10 for a specific print substrate A 14 in comparison with a compensation profile 11 for a reference substrate. The location-dependency of the compensation intensity 8 is clearly evident here, since the compensation profiles 10, 11 over the individual print heads 5 extend on the X-axis of the diagram with regard to position over the print width 9 in FIG. 2.

Figure 3:
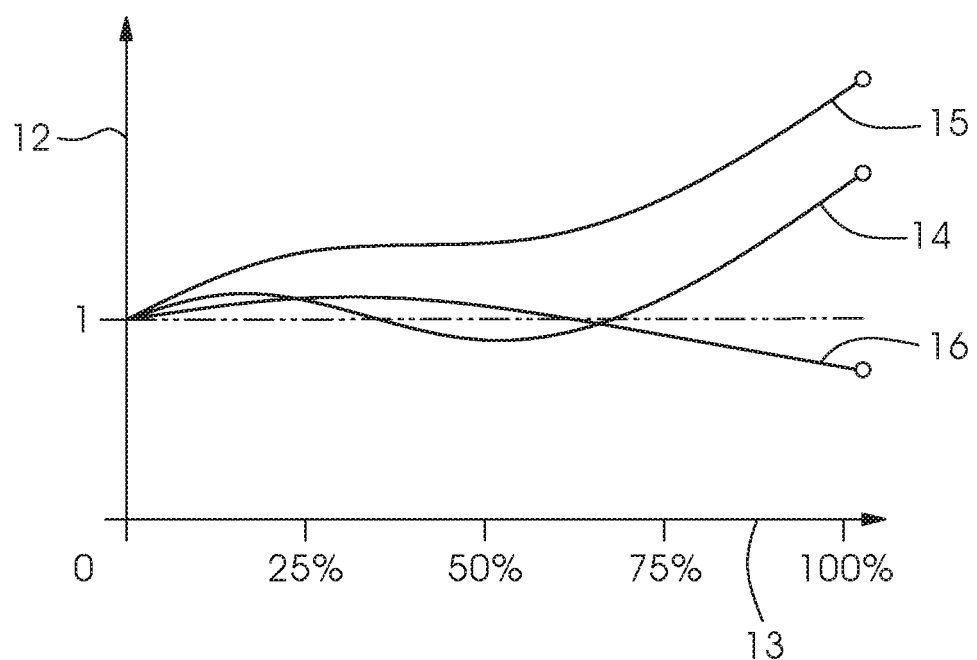
FIG. 3 is a diagram for the mean compensation behavior of different substrates depending on the surface coverage.

From the computer-supported comparison of these compensation profiles 10, 11 with the reference profile, the transferrable properties are determined for the substrates A, B, C, 14, 15, 16. In the simplest case, these are purely dependent on surface coverage and not location. The coverage-dependent factors may be calculated for example as mean values, median values or other statistical characteristic values from the ratio of the compensation intensities 8 for print substrate A 14 to the reference substrate over the entire print width 9. An example of these characteristic values in the form of the ratio of the coverage-dependent compensation intensity 12 is shown in FIG. 3.

From the coverage-dependent, substrate-specific factors and this location-dependent, head-specific compensation values, the computer 6 can determine the necessary total compensation profile.

If the total compensation profile must be updated because of changes in the jetting behavior of the print heads 5, e.g. due to ageing or wear, only the head-specific part 10 need be rerecorded. The substrate-specific influences are fixed and need no longer be determined again for each compensation profile recording. They are presumably also transferable to inkjet printers 7 with the same construction and print process parameters.

The influences from point 3 are thus controlled and kept constant as far as possible.

This method according to the invention in its standard variant may also be adapted in the following, further preferred embodiment variants:
  a. Since photo paper is fairly costly for recording the reference profile 11, for example instead of photo paper, an arbitrary print substrate 2 may be used, ideally with a "mean" or average behavior. Or a substrate 2 representative of a substrate class may be used if the substrates are divided into classes. However, when photo paper is used, influences from the precoat application are avoided.
  b. The transfer of the compensation profile 11 for the reference substrate to other print substrates 14, 15, 16 may take place using more complex methods or mathematical models. Models are also conceivable which take into account physical parameters for the print substrate surfaces. Parameters are e.g. the spreading behavior, the surface energy, the penetration behavior of the ink etc. However, taking into account specific print substrates 14, 15, 16 purely via the surface coverage 13 or density, irrespective of the location of compensation 8 transversely to the print direction, leads to very simple models and is therefore preferred.
  c. The stitching regions between individual print heads of a color may be treated separately because of the special influences.
  d. The compensation profiles 10, 11 for the print substrates 14, 15, 16 are recorded repeatedly and then statistically evaluated. The results are stored by the computer 6 in a database for print substrates 14, 15, 16, and re-used for the next print task with the print substrates 14, 15, 16 concerned. This generally reduces the influence of measurement errors and process noise.
  e. By using the database for print substrates 14, 15, 16, learning processes for determining the specific dependencies are applied.
  f. Use of identical transfer models for equivalent print substrates 14, 15, 16 of different formats, thicknesses and substances, but identical line application.

The advantages of the method according to the invention in its various embodiment variants shown, in comparison with the procedures known from the prior art, can be summarized in the following points:
  a. There is a clear reduction in cost for compensation profile determination on print substrate qualification.
  b. The calculation process for the compensation intensities 8 is simpler.
  c. The procedure when replacing a single print head 5 is less complex.
  d. The calculation process produces a smaller data volume and is therefore more efficient.

The following is a summary list of reference numerals and the corresponding structure used in the above description of the invention:
  1 Feeder
  2 Print substrate
  3 Delivery unit
  4 Inkjet print system
  5 Inkjet print head
  6 Computer
  7 Inkjet printer
  8 Location-dependent compensation intensity
  9 Position over print width
  10 Compensation profile for substrate A
  11 Compensation profile for reference substrate
  12 Coverage-dependent compensation ratio of compensation intensity of selected substrate to reference substrate
  13 Surface coverage
  14, 15, 16 Substrates A, B, C

The invention claimed is:

1. A method of compensating for position-dependent density fluctuations of print nozzles in print heads of an inkjet printer by a computer, the method comprising:
  for all substrates used, using the computer to produce compensation profiles for the position-dependent density fluctuations over all print heads of the inkjet printer;
  determining with the computer in each case printer-specific or print head-specific influences and print substrate-specific influence factors with a generic reference print substrate and producing therefrom a reference compensation profile that is dependent on a surface coverage and location;
  producing a total compensation profile to compensate for position-dependent density fluctuations and, during printing, applying the compensation profile to compensate for the position-dependent density fluctuations in the inkjet printer.

2. The method according to claim 1, which comprises determining the print substrate-specific influence factors with the computer by producing specific compensation profiles for the print substrates, and comparing the specific compensation profiles with the reference compensation profile, wherein the print substrate-specific influence factors are purely dependent on surface coverage.

3. The method according to claim 2, which comprises calculating with the computer the print substrate-specific influence factors as mean values, median values or other statistical characteristic values, from a ratio of the compensation intensities and the specific print substrate to the reference substrate over an entire print width.

4. The method according to claim 1, which comprises, adapting the total compensation profile to modified printer or print head parameters, and thereby only redetermining the printer- or print head-specific influences with the computer.

5. The method according to claim 4, which comprises storing the printer- or print head-specific influences in a database and using the influences in the inkjet printer for further print jobs.

6. The method according to claim 1, which comprises causing the computer to separately take into account the printer-specific or print head-specific influences for transitional regions between individual print heads of a printing ink.

7. The method according to claim 1, which comprises repeatedly recording the specific compensation profiles for the print substrates that are being used, storing the results in the database, and statistically evaluating the results with the computer.

8. The method according to claim 1, which comprises selecting the generic reference print substrate as a print substrate with average properties or as a print substrate that is representative of a substrate class.

* * * * *